United States Patent
Park et al.

(10) Patent No.: US 7,701,524 B2
(45) Date of Patent: Apr. 20, 2010

(54) LCD DEVICE COMPRISING THE DRAIN ELECTRODE CONNECTED TO AN UPPER AND A SIDE PORTION OF THE PIXEL ELECTRODE AND FABRICATION METHOD THEREOF

(75) Inventors: Yong In Park, Gyeonggi-Do (KR); Juhn Suk Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 641 days.

(21) Appl. No.: 11/167,112

(22) Filed: Jun. 28, 2005

(65) Prior Publication Data
US 2006/0044484 A1  Mar. 2, 2006

(30) Foreign Application Priority Data
Aug. 26, 2004  (KR) .................. 10-2004-0067616

(51) Int. Cl.
G02F 1/136 (2006.01)
G02F 1/1333 (2006.01)
G02F 1/1343 (2006.01)
H01L 27/14 (2006.01)
H01L 21/00 (2006.01)

(52) U.S. Cl. .................. 349/47; 349/42; 349/43; 349/138; 349/147; 257/72; 438/30

(58) Field of Classification Search ............. 349/41–53, 349/139–148, 54–55, 122, 138, 192; 272/72; 438/30
See application file for complete search history.

(56) References Cited

U.S. PATENT DOCUMENTS

| | | | |
|---|---|---|---|
| 6,309,903 B2 * | 10/2001 | Shin et al. .................. 438/30 |
| 6,403,409 B1 | 6/2002 | You |
| 6,617,203 B2 | 9/2003 | Kim et al. |
| 6,753,235 B2 | 6/2004 | So et al. |
| 2001/0003657 A1 | 6/2001 | Lee |
| 2002/0158995 A1* | 10/2002 | Hwang et al. .................. 349/43 |
| 2003/0164910 A1* | 9/2003 | Yamazaki et al. ........... 349/113 |
| 2003/0197187 A1* | 10/2003 | Kim et al. ..................... 257/83 |
| 2005/0134752 A1* | 6/2005 | Yang et al. .................... 349/42 |

FOREIGN PATENT DOCUMENTS

KR  19970003717 A  3/1997

(Continued)

Primary Examiner—Andrew Schechter
Assistant Examiner—Charles Chang
(74) Attorney, Agent, or Firm—McKenna Long & Aldridge LLP

(57) ABSTRACT

A method for fabricating an LCD device includes providing a substrate; forming an active pattern having a source region, a drain region and a channel region on the substrate; forming a first insulation film on the substrate; forming a gate electrode, a gate line and a pixel electrode on the substrate; forming a second insulation film on the substrate; forming a contact hole exposing a portion of the source and drain regions by removing a portion of the first and second insulation films; patterning the second insulation film on the pixel electrode at least a size corresponding to a form of the pixel electrode; and forming a source electrode electrically connected to the source region and a drain electrode electrically connected to the drain region through the contact hole.

20 Claims, 17 Drawing Sheets

FOREIGN PATENT DOCUMENTS

| | | |
|---|---|---|
| KR | 19970008589 A | 5/1997 |
| KR | 19970011966 A | 8/1997 |
| KR | 19970028766 A | 8/1998 |
| KR | 19970024305 A | 10/1998 |
| KR | 19970063774 A | 11/1998 |
| KR | 19970077363 A | 12/1998 |
| KR | 19970063680 A | 1/1999 |
| KR | 20000025565 A | 5/2000 |
| KR | 20000026894 A | 5/2000 |
| KR | 20000026895 A | 5/2000 |
| KR | 20000031451 A | 6/2000 |
| KR | 20000041223 A | 7/2000 |
| KR | 20000075031 A | 12/2000 |
| KR | 20010019665 A | 3/2001 |
| KR | 20010019668 A | 3/2001 |
| KR | 19950004600 A | 5/2001 |
| KR | 20010054739 A | 7/2001 |
| KR | 20010055071 A | 7/2001 |
| KR | 20010056037 A | 7/2001 |
| KR | 20010110917 A | 12/2001 |
| KR | 20020009188 A | 2/2002 |
| KR | 20020022258 A | 3/2002 |
| KR | 20020071061 A | 9/2002 |
| KR | 20020071062 A | 9/2002 |
| KR | 20020074897 A | 10/2002 |
| KR | 20020078116 A | 10/2002 |
| KR | 20020079196 A | 10/2002 |
| KR | 20020080202 A | 10/2002 |
| KR | 20030006619 A | 1/2003 |
| KR | 20030030286 A | 4/2003 |

* cited by examiner

LCD DEVICE COMPRISING THE DRAIN ELECTRODE CONNECTED TO AN UPPER AND A SIDE PORTION OF THE PIXEL ELECTRODE AND FABRICATION METHOD THEREOF

This application claims the benefit of Korean Patent Application No. 2004-67616, filed on Aug. 26, 2004, which is hereby incorporated by reference for all purposes as if fully set forth herein.

BACKGROUND OF THE INVENTION

1. Field of Invention

The present invention relates to a liquid crystal display (LCD) device and its fabrication method. More particularly, the present invention relates to an LCD device and its fabrication method capable of simplifying a fabrication process and enhancing a yield by reducing the number of masks used for fabrication of a thin film transistor (TFT).

2. Description of the Related Art

As interests in information displays and demands for using a portable (mobile) information medium are increasing, research on and commercialization of a light thin film type flat panel display (FPD), which can substitute the existing display device CRT, are actively ongoing.

Of the FPDs, in particular, an LCD, a device for expressing an image by using an optical anisotropy of liquid crystal, exhibits excellent resolution, color display and picture quality. So, the LCD has been actively applied for notebooks, desktop monitors and the like.

The liquid crystal display panel includes a first substrate, namely, a color filter substrate, a second substrate, namely, an array substrate, and a liquid crystal layer formed between the color filter substrate and the array substrate.

As a switching device of the liquid crystal display, a thin film transistor (TFT) is commonly used, and as a channel layer of the TFT, an amorphous silicon thin film or a polycrystalline silicon thin film is used.

In a process for fabricating the LCD device, a plurality of masking processes (namely, photolithography process) are required for fabricating the LCD device including the TFT. Thus, a method for reducing the number of masking processes is on demand in terms of productivity.

The structure of the related art LCD device will now be described with reference to FIG. 1.

FIG. 1 is a plan view showing a portion of an array substrate of the related art LCD device. Although an actual LCD device includes M×N number of pixels as the N number of gate lines and the M number of data lines cross each other, only one pixel is shown in FIG. 1 for the sake of explanation.

As shown, a gate line 16 and a data line 17 are arranged vertically and horizontally on an array substrate 10, defining a pixel region. A TFT as a switching device is formed at the crossing of the gate line 16 and the data line 17. A pixel electrode 18 is formed at each pixel region.

The TFT includes a gate electrode 21 connected to the gate line 16, a source electrode 22 connected to the data line 17 and a drain electrode 23 connected to the pixel electrode 18. The TFT also includes a first insulation film (not shown) and a second insulation film (not shown) for insulating the gate electrode 21 and source and drain electrodes 22 and 23, and an active pattern 24 for forming a conductive channel between the source and drain electrodes 22 and 23 by a gate voltage supplied to the gate electrode 21.

Through the first contact hole 40A formed at the first and second insulation films, the source electrode 22 is electrically connected with a source region of the active pattern 24 and the drain electrode 23 is electrically connected with a drain region of the active pattern 24.

A third insulation film (not shown) having a second contact hole 40B is formed on the drain electrode 23, so that the drain electrode 23 and the pixel electrode 18 are electrically connected through the second contact hole 40B.

FIGS. 2A to 2F are sequential sectional views of the process for fabricating the LCD device of FIG. 1 taken along line I-I'. The illustrated TFT is a polycrystalline silicon TFT which uses polycrystalline silicon as a channel layer.

As shown in FIG. 2A, the active pattern 24 is formed as a polycrystalline silicon thin film on the substrate 10 by using a photolithography process (a first masking process).

Next, as shown in FIG. 2B, a first insulation film 15A and a conductive metal material are sequentially deposited on the entire surface of the substrate 10 with the active pattern 24 formed thereon. Then, the conductive metal material is selectively patterned using a photolithography process (a second masking process) to form the gate electrode 21 over the active pattern 24 with the first insulation film 15A interposed therebetween.

Thereafter, p+ type or n+ type source and drain regions 24A and 24B are formed at certain regions of the active pattern 24 by injecting a high density impurity ion (namely, dopant) using the gate electrode 21 as a mask. The source and drain regions 24A and 24B are formed for ohmic contacting with source and drain electrodes (to be described).

As shown in FIG. 2C, a second insulation film 15B is formed on the entire surface of the substrate 10 with the gate electrode 21 formed thereon. Then, a portion of the first and second insulation films 15A and 15B is removed through photolithography (a third masking process) to form the first contact hole 40A exposing a portion of the source and drain regions 24A and 24B.

Subsequently, as shown in FIG. 2D, a conductive metal material is deposited on the entire surface of the substrate 10 and then patterned using a photolithography process (a fourth masking process) to form the source electrode 22 connected with the source region 24A and the drain electrode 23 connected with the drain region 24B through the first contact hole 40A. In this case, a portion of the conductive metal layer constituting the source electrode 22 extends in one direction to form the data line 17.

As shown in FIG. 2E, a third insulation film 15C is deposited on the entire surface of the substrate 10, and then, a second contact hole 40B is formed, exposing a portion of the drain electrode 23 using a photolithography process (a fifth masking process).

Finally, as shown in FIG. 2F, a transparent conductive metal material is deposited on the entire surface of the substrate 10 with the third insulation film 15C formed thereon and then patterned using a photolithography process (a sixth masking process) to form the pixel electrode 18 connected with the drain electrode 23 through the second contact hole 40B.

As mentioned above, in fabricating the LCD device including the polycrystalline silicon TFT, a total of six photolithographic processes are required to pattern the active pattern, the gate electrode, the first contact hole, the source and drain electrodes, the second contact hole and the pixel electrode.

The photolithography process is a process of transferring a pattern formed on a mask onto the thin film-deposited substrate to form a desired pattern, including a plurality of processes such as applying a photosensitive solution, exposing and developing process. As a result, the plurality of photolithography processes reduce a production yield and cause a high possibility that a fabricated TFT is defective.

In particular, the mask designed to form the pattern is expensive, so an increase in the number of masks applied to the process leads to a proportional increase in fabrication costs.

SUMMARY OF THE INVENTION

Accordingly, the present invention is directed to a liquid crystal display device and fabrication method thereof that substantially obviates one or more of the problems due to limitations and disadvantages of the related art.

An advantage of the present invention is to provide a liquid crystal display (LCD) device capable of reducing the number of masks used for fabrication of a thin film transistor (TFT) by simultaneously forming a gate electrode, a gate line and a pixel electrode, and its fabrication method.

Another advantage of the present invention is to provide an LCD device capable of preventing disconnection of a drain electrode due to undercut at an edge of a pixel electrode by properly opening a pixel electrode region in a contact hole forming process, and its fabrication method.

To achieve these and other advantages and in accordance with the purpose of the present invention, as embodied and broadly described herein, there is provided a method for fabricating an LCD device including: providing a substrate; forming an active pattern having a source region, a drain region and a channel region on the substrate; forming a first insulation film on the substrate; forming a gate electrode, a gate line and a pixel electrode on the substrate; forming a second insulation film on the substrate; forming a contact hole exposing a portion of the source and drain regions by removing a portion of the first and second insulation films; patterning the second insulation film on the pixel electrode at least a size corresponding to a form of the pixel electrode; and forming a source electrode electrically connected to the source region and a drain electrode electrically connected to the drain region through the contact hole.

In another aspect of the invention, an LCD device includes: an active pattern on a substrate; a first insulation film on the substrate; a gate electrode and a gate line each consisting of first and second conductive films and a pixel electrode of the first conductive film, wherein the gate electrode, the gate line and the pixel electrode are substantially simultaneously patterned; a second insulation film on the substrate, the second insulation film having a contact hole, and opening the pixel electrode at least a size corresponding to a shape of the pixel electrode; and a source electrode connected to a source region and a drain electrode connected to a drain region through the contact hole, the source electrode and the drain electrode being formed on the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
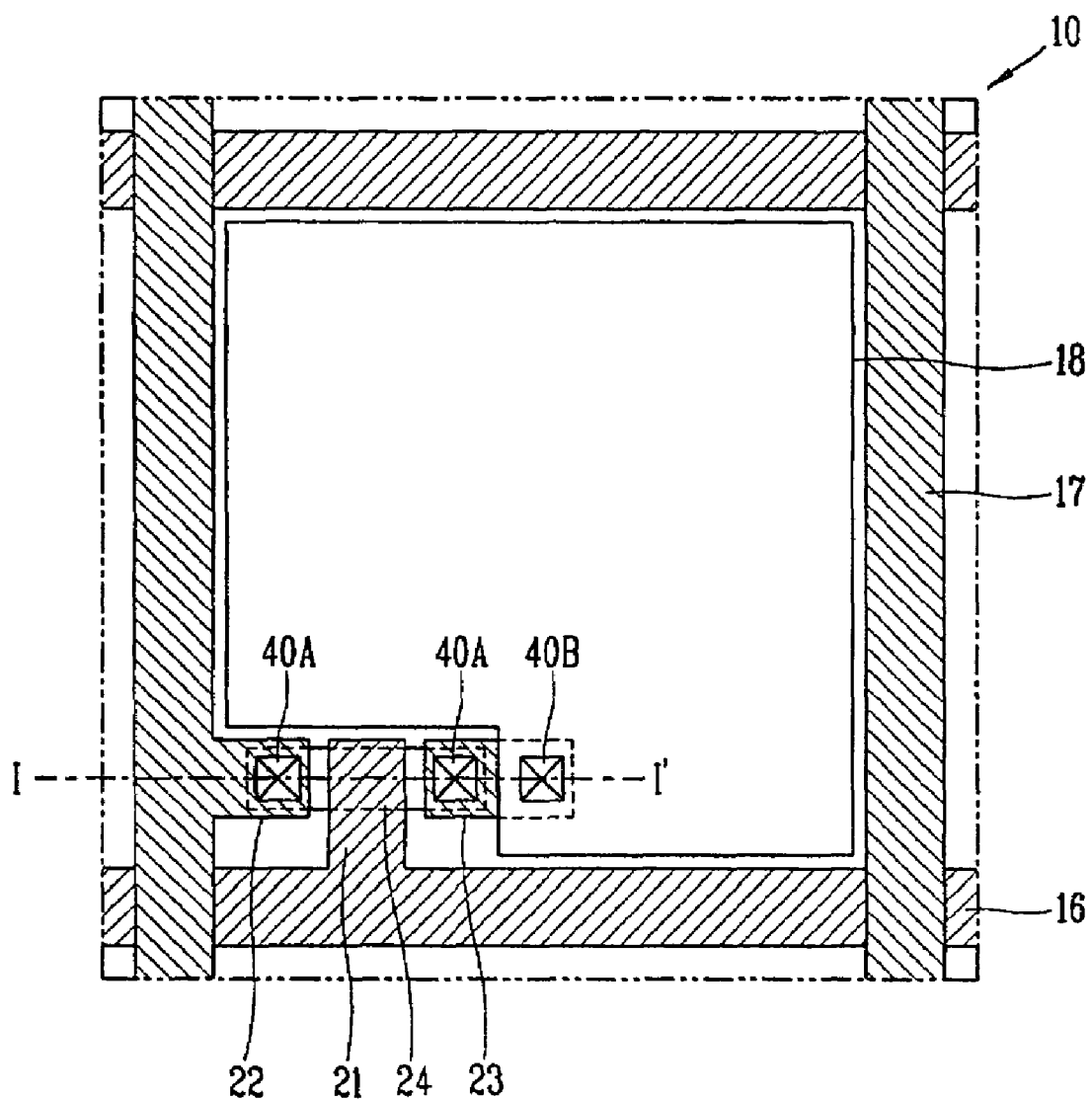
FIG. 1 is a plan view showing a portion of an array substrate of a related art LCD device.
Figure 2A:
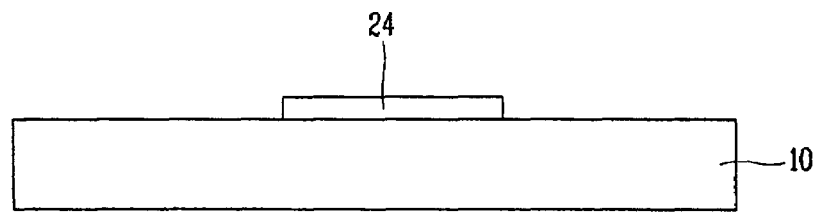
FIGS. 2A to 2F are sequential sectional views showing a process of fabricating the LCD device taken along line I-I' of FIG. 1.
Figure 2B:
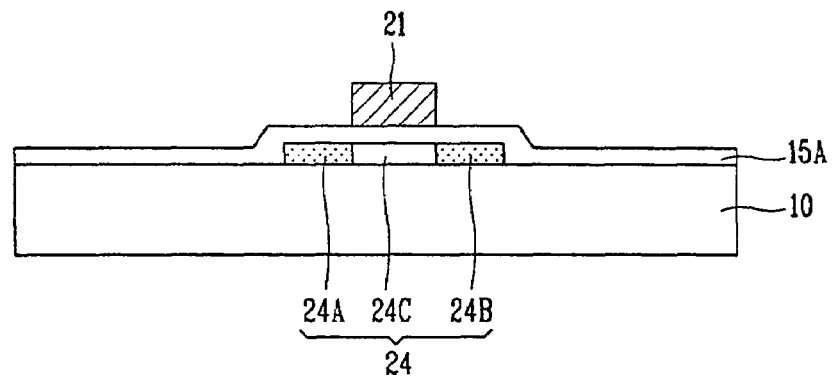
Figure 2C:
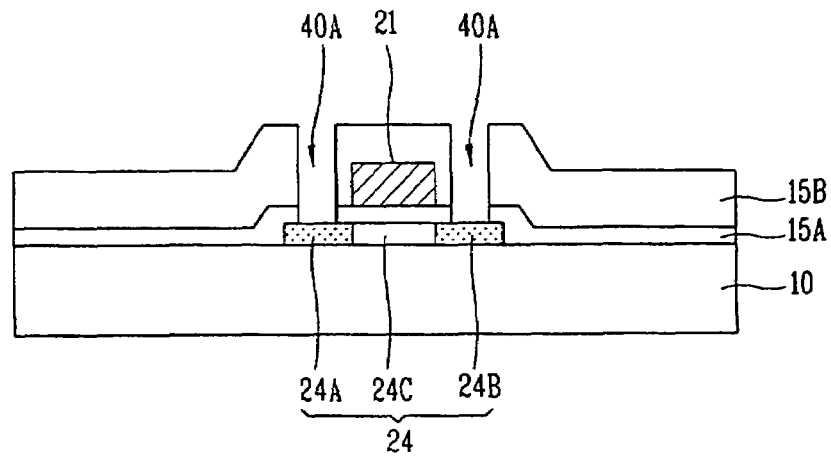
Figure 2D:
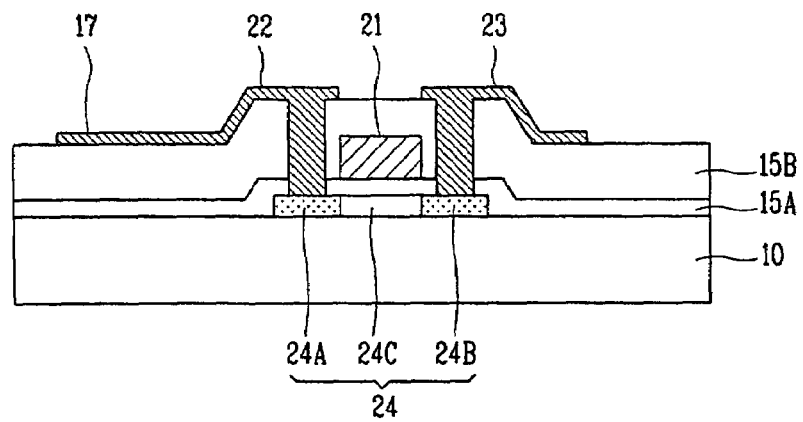
Figure 2E:
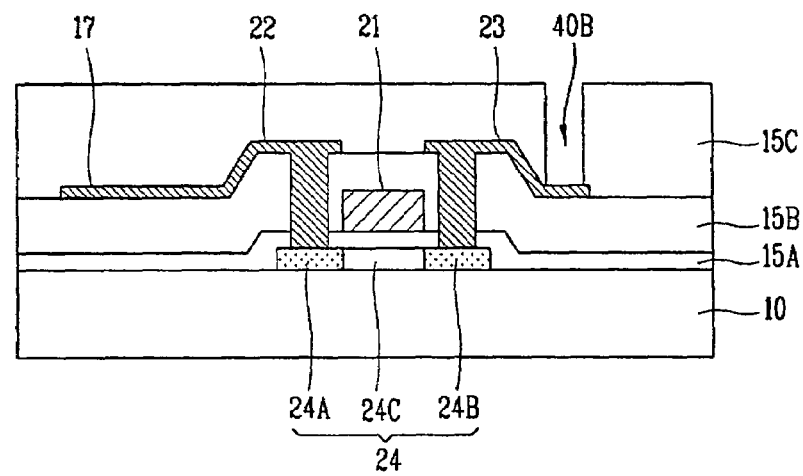
Figure 2F:
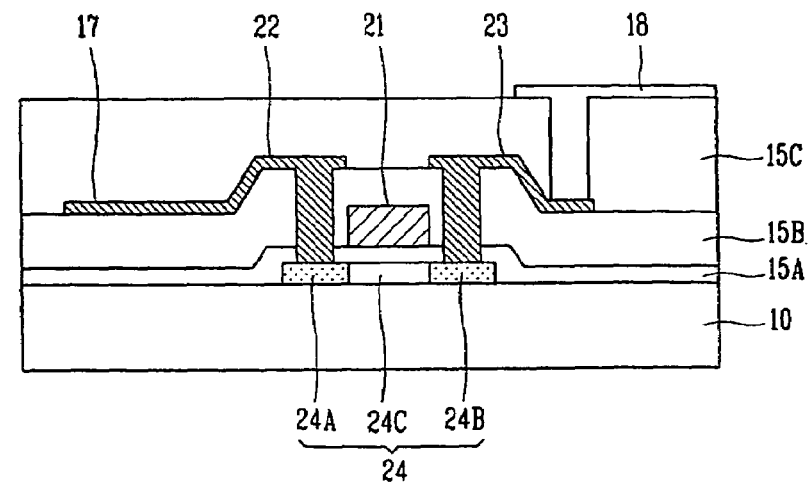
Figure 3:
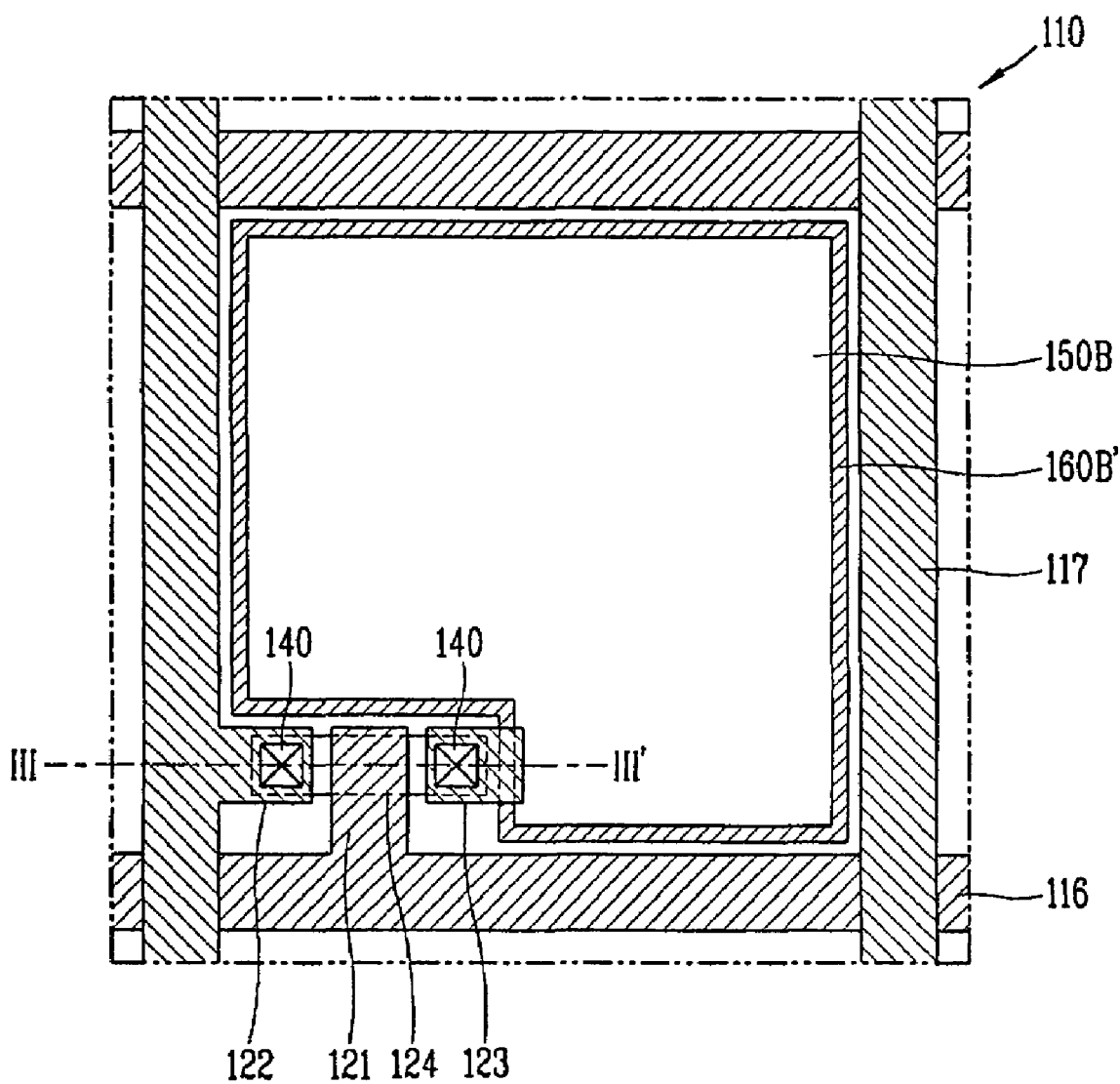
FIG. 3 is a plan view showing a portion of an array substrate of an LCD device in accordance with a first embodiment of the present invention.

FIG. 3 is a plan view showing a portion of an array substrate of an LCD device in accordance with the first embodiment of the present invention, particularly showing one pixel including a thin film transistor (TFT).

Although an actual LCD device includes M×N number of pixels as the N number of gate lines and the M number of data lines cross each other, only one pixel is shown in FIG. 3 for the sake of explanation.

In this embodiment, a polycrystalline silicon TFT using a polycrystalline silicon thin film as a channel layer is taken as an example, and the present invention is not limited thereto and an amorphous silicon thin film can be used as the channel layer of the TFT.

As shown, a gate line 116 and a data line 117 are arranged vertically and horizontally on the array substrate 110, defining a pixel region. In addition, a TFT as a switching device is formed at the crossing of the gate line 116 and the data line 117, and a pixel electrode 150B connected to the TFT and driving liquid crystal (not shown) together with a common electrode of a color filter substrate (not shown) are formed in the pixel region.

The gate line 116 including the gate electrode 121 and the pixel electrode 150B are simultaneously patterned and formed through the same masking process. The gate electrode 121 and the gate line 116 are formed as a dual layer consisting of first and second conductive films, and the pixel electrode 150B is formed as a single layer of the first conductive film.

The TFT includes the gate electrode 121 connected to the gate line 116, a source electrode 122 connected to the data line 117 and a drain electrode 123 connected to the pixel electrode 150B. In addition, the TFT also includes first and second insulation films (not shown) for insulating the gate electrode 121 and the source and drain electrodes 122 and 123, and an active pattern 124 for forming a conductive channel between the source electrode 122 and the drain electrode 123 by a gate voltage supplied to the gate electrode 121.

The source electrode 122 is electrically connected to a source region of the active pattern 124 and the drain electrode 123 is electrically connected to a drain region of the active pattern 124 through a contact hole 140 formed on the first and second insulation films. A portion of the source electrode 122 is connected to the data line 117 to form a portion of the data line 117 and a portion of the drain electrode 123 extends toward the pixel region and electrically connected to the pixel electrode 150B.

A conductive pattern 160B' formed of a gate metal (namely, a conductive material constituting the gate electrode 121 and the gate line 116 remains at an edge of the pixel electrode 150B to electrically connect the drain electrode 123 and the pixel electrode 150B. As mentioned above, by simultaneously forming the pixel electrode 150B with the gate electrode 121 and the gate line 116 on the same layer, the number of masks used for fabricating the TFT can be reduced, which will now be described in detail through a process for fabricating the LCD device.

FIGS. 4A to 4D are sequential sectional views showing a process of fabricating the LCD device taken along line III-III' of FIG. 3.

Figure 4A:
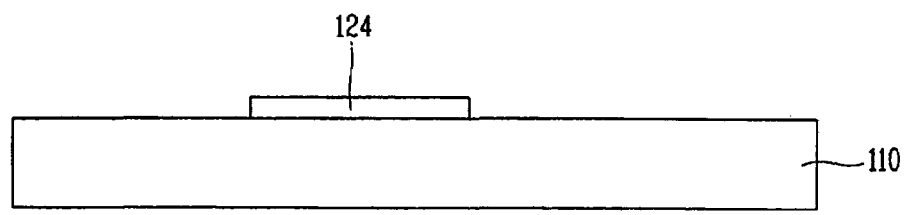
FIGS. 4A to 4D are sequential sectional views showing a process of fabricating the LCD device taken along line III-III' of FIG. 3.

As shown in FIG. 4A, the active pattern 124 is formed as a silicon layer on the substrate 110 made of a transparent insulation material such as glass using a photolithography process (a first masking process).

In this case, a buffer layer can be formed as a silicon oxide film (SiO2) on the substrate 110, on which the active pattern 124 can be formed. The buffer layer serves to prevent infiltration of an impurity such as natrium (Na) existing in the glass substrate 110 into an upper layer during a process.

The silicon layer can be formed as an amorphous silicon thin film or a crystallized silicon thin film, and in the present invention, the TFT is formed by using the crystallized polycrystalline silicon thin film. The polycrystalline silicon thin film can be formed using various crystallizing methods after the amorphous silicon thin film is formed on the substrate, which will be described as follows.

First, the amorphous silicon thin film can be deposited to be formed in various methods, of which a typical method is a low pressure chemical vapor deposition (LPCVD) and a plasma enhanced chemical vapor deposition (PECVD).

Thereafter, in order to remove hydrogen atoms existing in the amorphous silicon thin film, dehydrogenation process is performed and then crystallization is performed thereon. In order to crystallize the amorphous silicon thin film, solid phase crystallization (SPC) in which the amorphous silicon thin film is thermally treated in a high temperature furnace or examiner laser annealing (ELA) using laser can be used.

In laser crystallization, the ELA using a laser in a pulse form is commonly used. Research is ongoing on sequential lateral solidification (SLS) which remarkably improves crystallization characteristics by making grains grow laterally (in a horizontal direction).

The SLS uses the fact that grains are grown in a vertical direction to an interface of liquid phase silicon and solid phase silicon at the interface. By growing grains to a certain length laterally to control a size of a laser energy and laser beam irradiation range, the size of silicon grains can be enhanced.

Figure 4B:
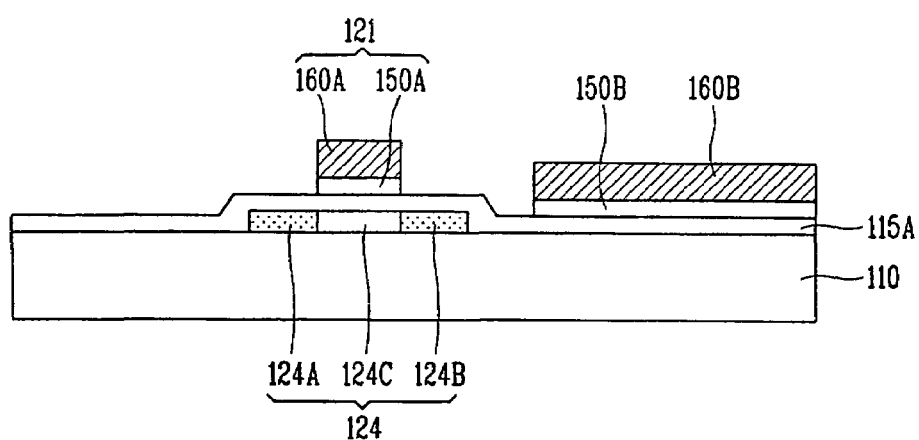
Figure 4C:
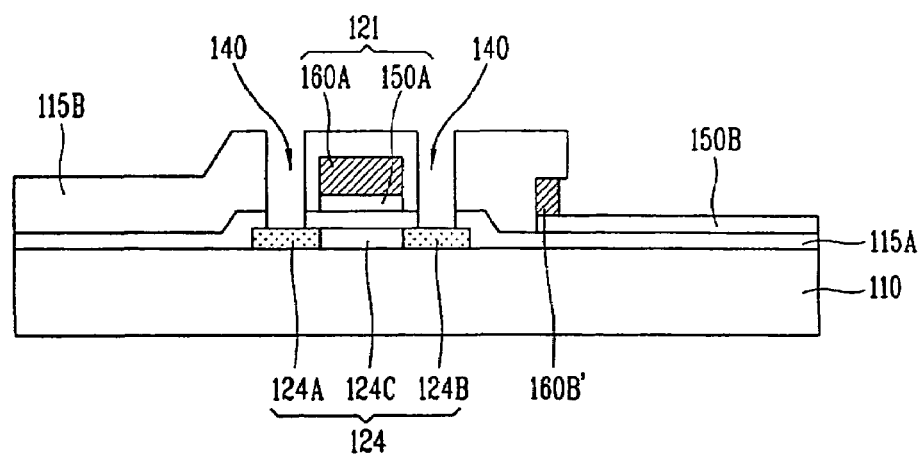

FIGS. 4B and 4C show the process of simultaneously forming the gate electrode, the gate line and the pixel electrode in accordance with the first embodiment of the present invention, which will now be described with reference to FIGS. 5A and 5D.

Figure 5A:
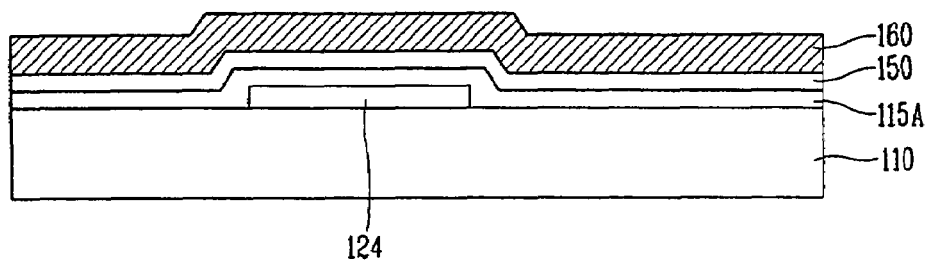
FIGS. 5A to 5D are sequential sectional views showing a process of simultaneously forming a gate electrode, a gate line and a pixel electrode in FIGS. 4B and 4C in accordance with the first embodiment of the present invention.

As shown in FIG. 5A, a first insulation film 115A, namely, a gate insulation film, a first conductive film 150 and a second conductive film 160 are sequentially formed on the entire surface of the substrate 110 with the active pattern 124 formed thereon.

The first conductive film 150 is made of a transparent conductive material with excellent transmittance such as indium tin oxide (ITO) or indium zinc oxide (IZO) to for form the pixel electrode, and the second conductive film 160 is made of a low-resistance opaque conductive material such as aluminum, an aluminum alloy, tungsten, copper, chromium, molybdenum or the like to form the gate electrode and the gate line.

Figure 5B:
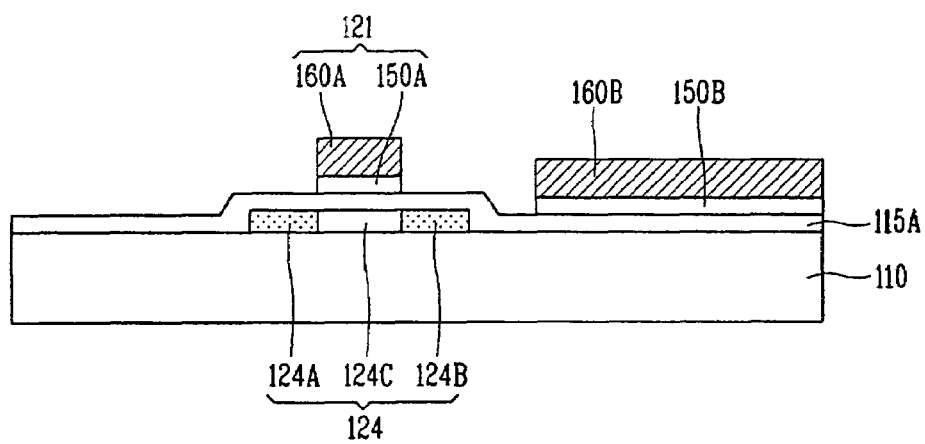

Next, as shown in FIG. 5B (or FIG. 4B), the second conductive film 160 and the first conductive film 150 are selectively patterned using a photolithography process (a second masking process) in order to form the gate electrode 121, the gate line (not shown) and the pixel electrode 150B on the substrate 110.

The gate electrode 121 includes a first gate electrode pattern 150A formed as a transparent first conductive film and a second gate electrode pattern 160A formed as an opaque second conductive film, and a pixel electrode pattern 160B formed as an opaque second conductive film with the same form as the pixel electrode 150B remains on the pixel electrode 150B made of the transparent first conductive film.

Thereafter, an impurity ion (namely, dopant) is injected into a certain region of the active pattern 124 by using the gate electrode 121 as a mask to form a source region 124A and a drain region 124B, namely, ohmic contact layers.

Figure 5C:
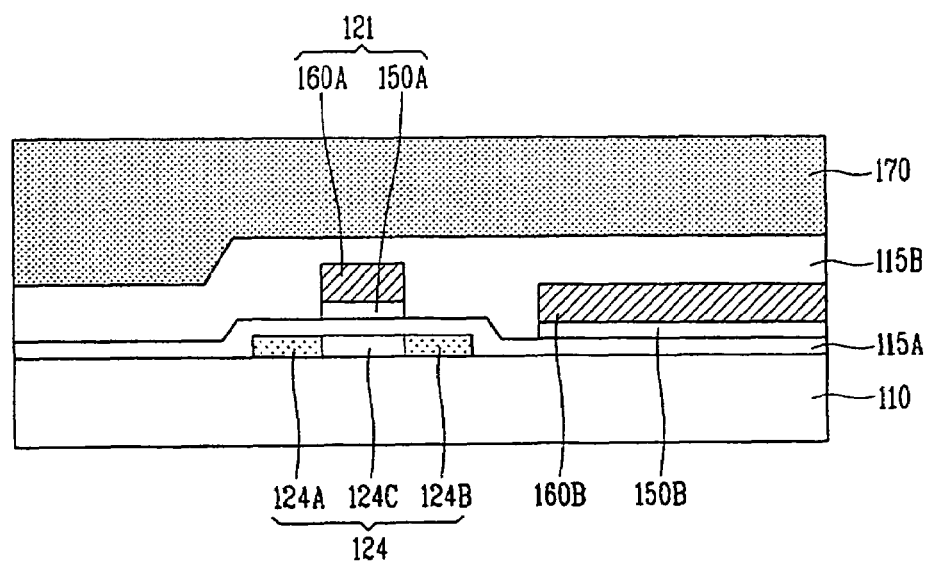

Thereafter, as shown in FIG. 5C, a second insulation film 115B is deposited on the entire surface of the substrate 110 with the gate electrode 121, the gate line 116 and the pixel electrode 150B formed thereon, to form a photosensitive film 170 made of a photosensitive material such as photoresist.

The second insulation film 115B can be made of a transparent organic insulation material such as benzocyclobutene (BCB) or an acrylic resin for a high aperture ratio.

Figure 5D:
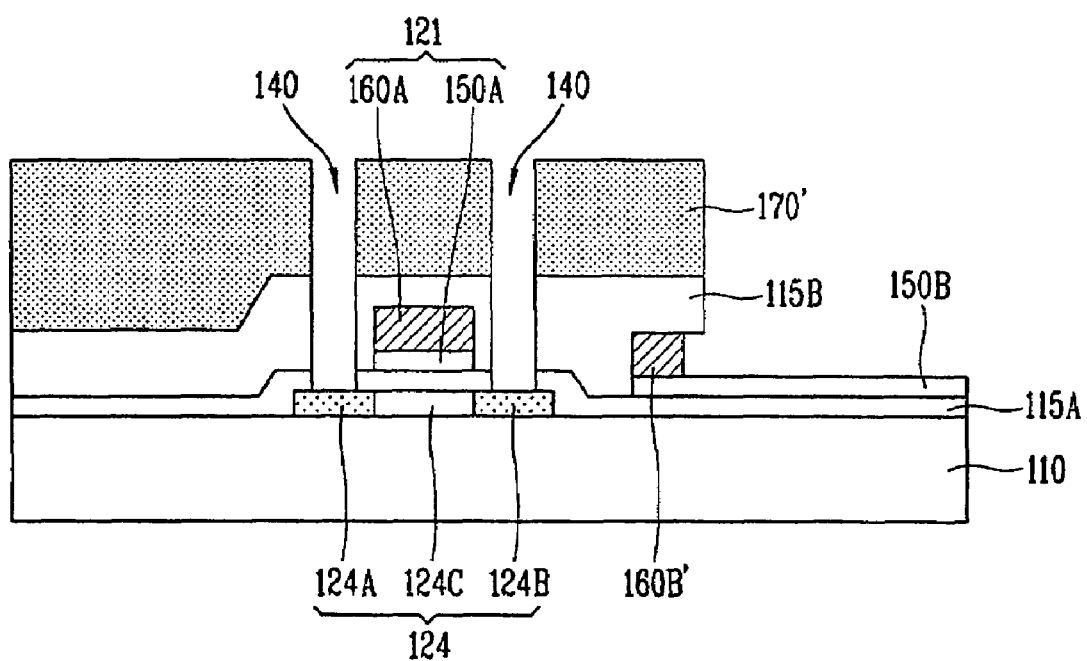

And then, as shown in FIG. 5D, light is irradiated on the photosensitive film 170 through the photolithography process (a third masking process) and then the exposed photosensitive film 170 is developed to form a photosensitive film pattern 170' forming the contact hole and opening the pixel electrode region.

Subsequently, a portion of the second insulation film 115B and the first insulation film 115A is removed using the photosensitive film pattern 170' as a mask to form a pair of contact holes 140 exposing a portion of the source and drain regions 124A and 124B of the active pattern 124, and simultaneously, the second insulation film 115B and the pixel electrode pattern 160B formed as the second conductive film at the pixel electrode region are removed to expose the surface of the pixel electrode 150B formed as the first conductive film made of the transparent conductive material.

In this case, in consideration of an alignment margin between a photolithography equipment and the mask, a contact hole mask designed to make the pixel electrode region open with a certain distance inwardly of the pixel electrode 150B, leaving the second conductive film pattern 160B' formed as the second conductive film at an edge of the upper portion of the pixel electrode 150B.

The pixel electrode pattern 160B is removed using the second insulation film 115B pattern (or the photosensitive film pattern 170') patterned through the contact hole mask which also opens the pixel electrode region simultaneously in forming the contact hole 140, rather than using an additional mask, and in this case, the second conductive film, namely, the pixel electrode pattern 160B is excessively etched to generate an undercut at the boundary between the second insulation film 115B at the upper portion of the edge of the pixel electrode 150B and the second conductive film pattern 160B'.

Thereafter, as shown in FIG. 4C, the photosensitive film pattern 170 is removed and then the photolithography process is performed twice to form the gate electrode 121, the gate line 116 and the pixel electrode 150B, and at the same time, the contact hole 140 is formed to expose the source and drain regions 124A and 124B.

Figure 4D:
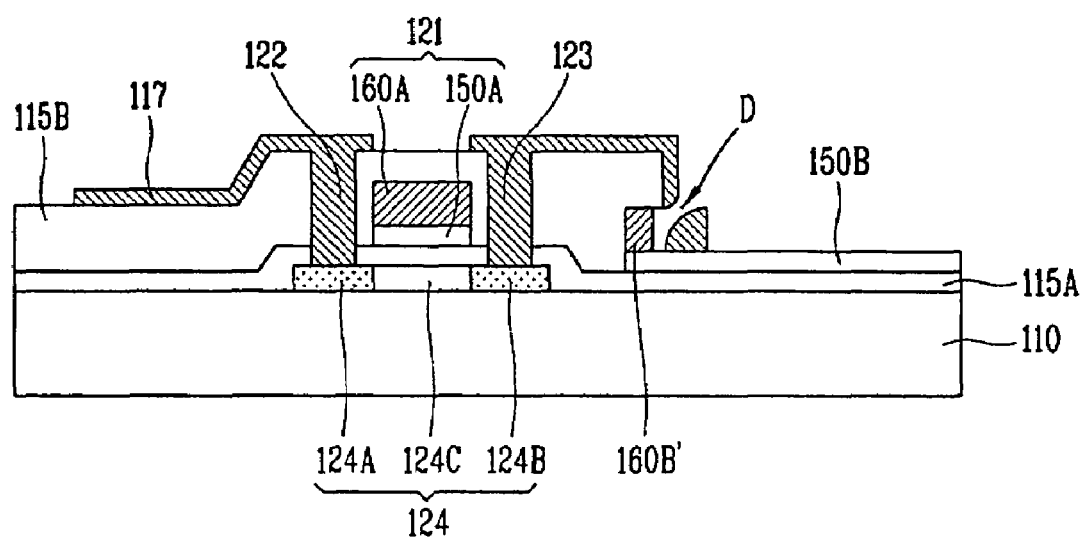

And then, as shown in FIG. 4D, a third conductive film is deposited on the entire surface of the substrate 110 and then patterned by using the photolithography process (a fourth masking process) to form the source electrode 122 connected with the source region 124A and the drain electrode 123 connected with the drain region 124B through the contact hole 140.

At this time, a portion of the source electrode 122 extends in one direction to form the data line 117 and a portion of the drain electrode 123 extends toward the pixel electrode so as to be electrically connected with the pixel electrode 150B through the second conductive film pattern 160B' positioned on the pixel electrode 150B. In this case, since the drain electrode 123 is directly connected with the pixel electrode 150B, rather than by forming a contact hole through an additional masking process, a contact hole forming process is not necessary and thus one masking process can be omitted.

In the process of fabricating the LCD device in accordance with the first embodiment of the present invention, the gate electrode, the gate line and the pixel electrode are simultaneously patterned and one contact hole forming process is reduced, so that two masking processes are reduced compared with a related art fabrication process. Accordingly, the yield can be increased due to the simplification of the fabrication process and the fabrication cost can be reduced.

However, as shown, due to the undercut at the second conductive film pattern 160B' formed at the upper portion of the edge of the pixel electrode 150B, the drain electrode 123 and the pixel electrode 150B are not connected.

Thus, the second conductive film is etched to open the pixel electrode region in the following process of forming the source and drain electrodes in order to prevent the deficiency of disconnection between the drain electrode and the pixel electrode due to the undercut of the second conductive film pattern. This will be described in detail in the second embodiment of the present invention as follows.

The deficiency of disconnection between the drain electrode and the pixel electrode is generated due to an undercut of the second conductive film pattern formed in the course of removing the opaque second conductive film at the upper portion of the pixel electrode in the contact hole forming process after the gate electrode, the gate line and the pixel electrode are patterned using one photolithography process to reduce the number of masking processes. The disconnection between the drain electrode and the pixel electrode can be prevented by opening the pixel electrode region by applying a mask having the same size as or greater than the pixel electrode in the contact hole forming process to prevent the second conductive film pattern from remaining at the upper portion of the pixel electrode. This will now be described with reference to the second embodiment of the present invention.

Figure 6:
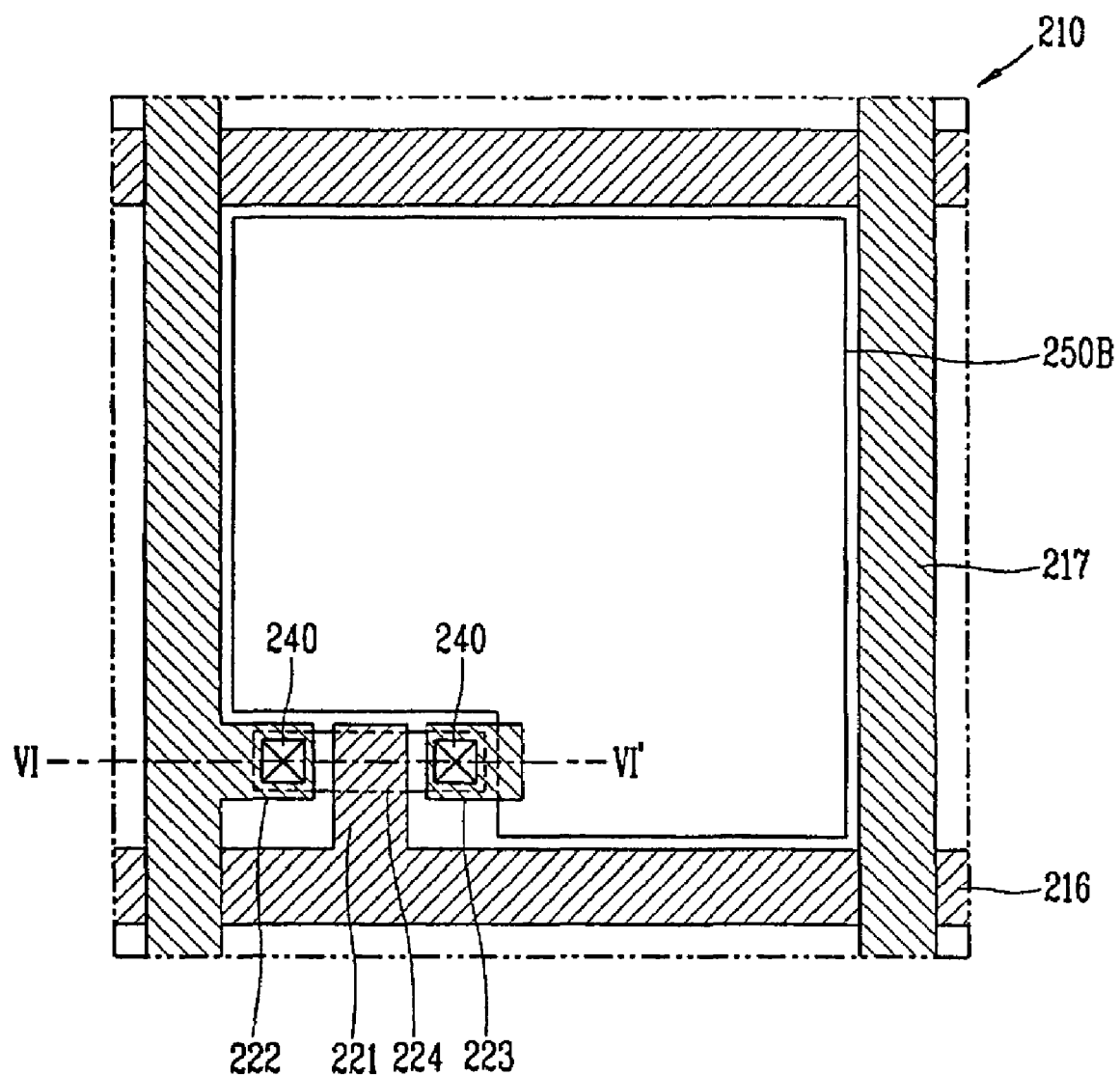
FIG. 6 is a plan view showing a portion of an array substrate of an LCD device in accordance with a second embodiment of the present invention.

FIG. 6 is a plan view showing a portion of an array substrate of an LCD device in accordance with a second embodiment of the present invention.

The second embodiment of the present invention has the same construction as that of the first embodiment, except that after the gate electrode, the gate line and the pixel electrode are simultaneously patterned, the pixel electrode region is opened using a mask having the same size as or greater than the pixel electrode in the contact hole forming process in order to prevent the second conductive film pattern from remaining at the edge of the upper portion of the pixel electrode like in the first embodiment of the present invention. Accordingly, the drain electrode is directly connected with the pixel electrode electrically.

As shown, a gate line 216 and a data line 217 are arranged vertically and horizontally on the array substrate 210, defining a pixel region. In addition, a TFT as a switching device is formed at the crossing of the gate line 216 and the data line 217, and a pixel electrode 250B connected with the TFT and driving liquid crystal (not shown) together with a common electrode of a color filter substrate (not shown) is formed in the pixel region.

The gate line 216 including the gate electrode 221 and the pixel electrode 250B are simultaneously patterned through the same masking process. The gate electrode 221 and the gate line 216 are formed as a dual layer consisting of first and second conductive films, and the pixel electrode 250B is formed as a single layer of a first conductive film.

The TFT includes the gate electrode 221 connected to the gate line 216, a source electrode 222 connected to the data line 217 and a drain electrode 223 connected to the pixel electrode 250B. In addition, the TFT also includes first and second insulation films (not shown) for insulating the gate electrode 221 and the source and drain electrodes 222 and 223, and an active pattern 224 forming a conductive channel between the source electrode 222 and the drain electrode 223 by a gate voltage supplied to the gate electrode 221.

The source electrode 222 is electrically connected to a source region of the active pattern 224 and the drain electrode 223 is electrically connected to a drain region of the active pattern 224 through a contact hole 240 formed at the first and second insulation films. A portion of the source electrode 222 is connected to the data line 217 to form a portion of the data line 217 and a portion of the drain electrode 223 extends toward the pixel region and electrically connected to the pixel electrode 250B.

At this time, such a conductive film pattern as in the first embodiment does not remain at the edge of the pixel electrode 250B, so the drain electrode 223 is directly connected to the pixel electrode 250B electrically, whereby the disconnection between the drain electrode and the pixel electrode according to undercut of the conductive film pattern can be prevented.

In this manner, because the pixel electrode 250B is simultaneously formed with the gate electrode 221 and the gate line 216 on the same layer, the number of masks to be used for fabrication of the TFT can be reduced. Additionally, because the pixel electrode 250B region is opened by using the mask with the same size or greater than the pixel electrode 250B in the follow-up contact hole forming process, the second conductive film pattern does not remain and thus disconnection between the drain electrode and the pixel electrode like in the first embodiment can be prevented. This will now be described in detail through a process of fabricating the LCD device.

FIGS. 7A to 7D are sequential sectional views showing a process of fabricating the LCD device taken along line VI-VI' of FIG. 6, and FIGS. 8A to 8D are plan views sequentially showing a process for fabricating the LCD device in accordance with the second embodiment of the present invention.

Figure 7A:
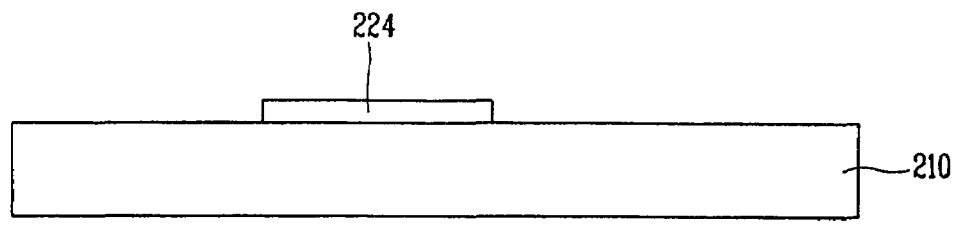
FIGS. 7A to 7D are sequential sectional views showing a process of fabricating the LCD device taken along line VI-VI' of FIG. 6.
Figure 8A:
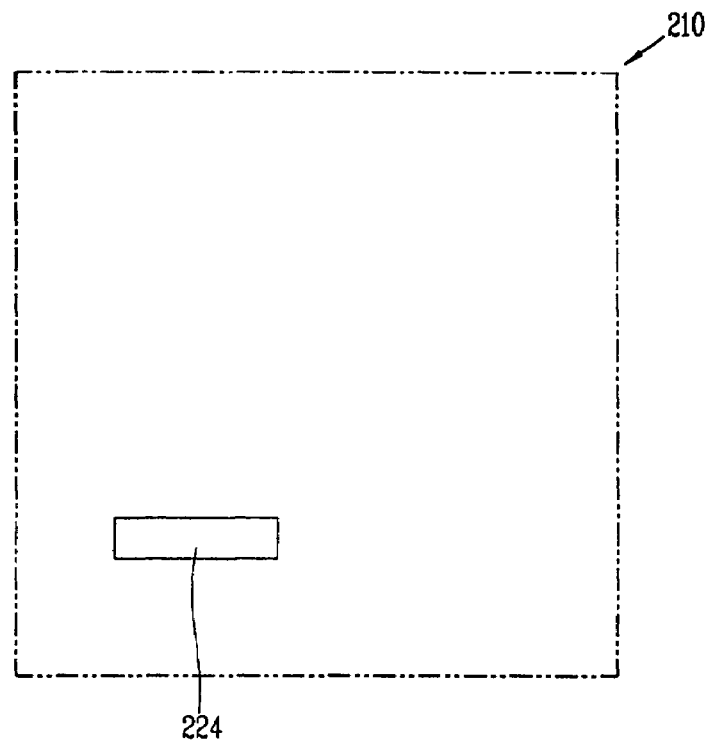
FIGS. 8A to 8D are plan views sequentially showing a process for fabricating the LCD device in accordance with the second embodiment of the present invention.

As shown in FIGS. 7A and 8A, an active pattern 224 is formed as a silicon layer using a photolithography process (a first making process) on the substrate 210 made of a transparent insulation material such as glass.

Figure 7B:
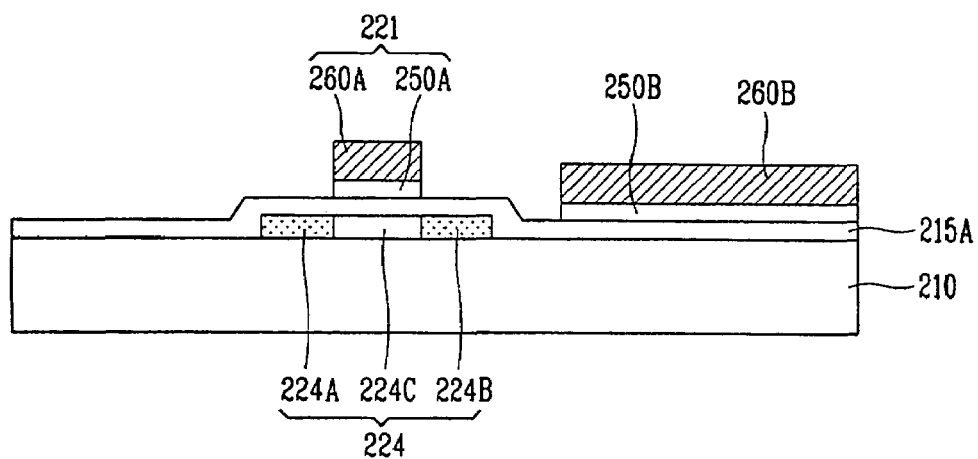
Figure 8B:
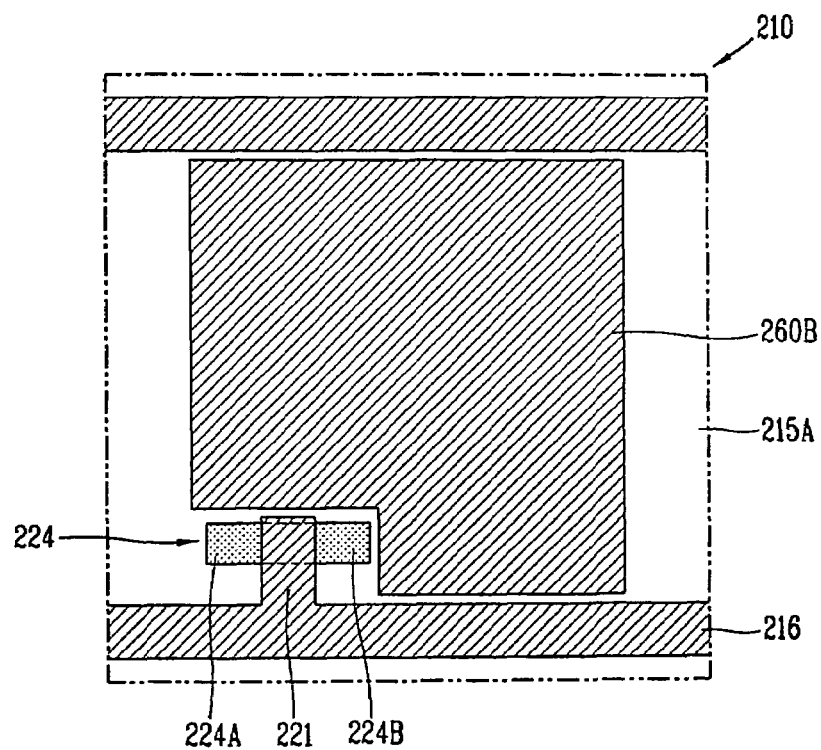

Next, as shown in FIGS. 7B and 8B, a first insulation film 215A, a first conductive film and a second conductive film are sequentially formed on the entire surface of the substrate 210. Then, the first and second conductive films are selectively patterned using a photolithography process (a second masking process) to simultaneously form a gate electrode 221, a gate line 216 and a pixel electrode 250B.

The gate electrode 221 includes a first gate electrode pattern 250A formed as a transparent first conductive film and a second gate electrode pattern 260A formed as an opaque second conductive film, and a pixel electrode pattern 260B formed as an opaque second conductive film with the same form as the pixel electrode 250B remains on the pixel electrode 250B made of the transparent first conductive film.

At this time, The first conductive film is made of a transparent conductive material with excellent transmittance such as indium tin oxide (ITO) or indium zinc oxide (IZO) for forming the pixel electrode 250B, and the second conductive film is made of a low-resistance opaque conductive material such as aluminum, an aluminum alloy, tungsten, copper, chromium, molybdenum or the like for forming the gate line 216 including the gate electrode 221.

The second conductive film can be formed as the same transparent conductive material as the first conductive film.

Thereafter, an impurity ion (namely, dopant) is injected into a certain region of the active pattern 224 using the gate electrode 221 as a mask to form a source region 224A and a drain region 224B, namely, ohmic contact layers. In this case, the gate electrode 221 serves as an ion stopper preventing infiltration of the dopant into the channel region 224C of the active pattern 224.

Electrical characteristics of the active pattern 224 can change according to a type of the injected dopant. If the injected dopant is a 3-group element such as boron (B), the TFT operates as a P-type TFT, while if the injected dopant is a 5-group element such as phosphor (P), the TFT operates as an N-type TFT.

After the ion-injection process, a process for activating the injected dopant can be performed.

Figure 7C:
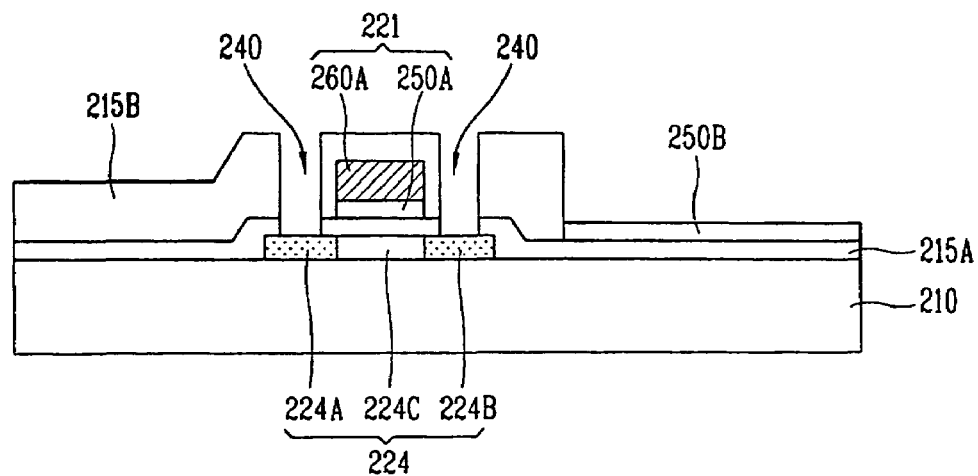
Figure 8C:
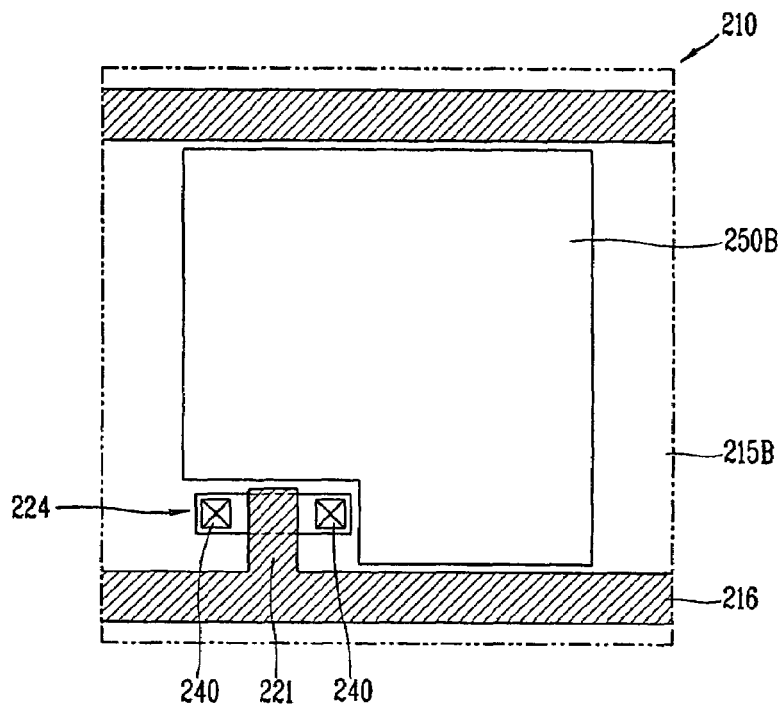

Next, as shown in FIGS. 7C and 8C, a second insulation film 215B is deposited on the entire surface of the substrate 210 with the gate electrode 221, the gate line 216 and the pixel electrode 250B formed thereon, and then, the second insulation film 215B and the first insulation film 215A are selectively patterned through the photolithography process (a third masking process) to form a contact hole 240 at the source/drain regions 224A and 224B and, at the same time, open the pixel electrode 250B region. In this embodiment of the present invention, in order to prevent deficiency of disconnection between the drain electrode and the pixel electrode, the pixel electrode 250B region is opened using a contact hole mask having the same size as or greater than the pixel electrode 250B. This will now be described with reference to the accompanying drawings.

FIGS. 9A to 9D are sectional views showing a third masking process for forming a contact hole and opening a pixel electrode region in FIG. 7C in accordance with the second embodiment of the present invention.

Figure 9A:
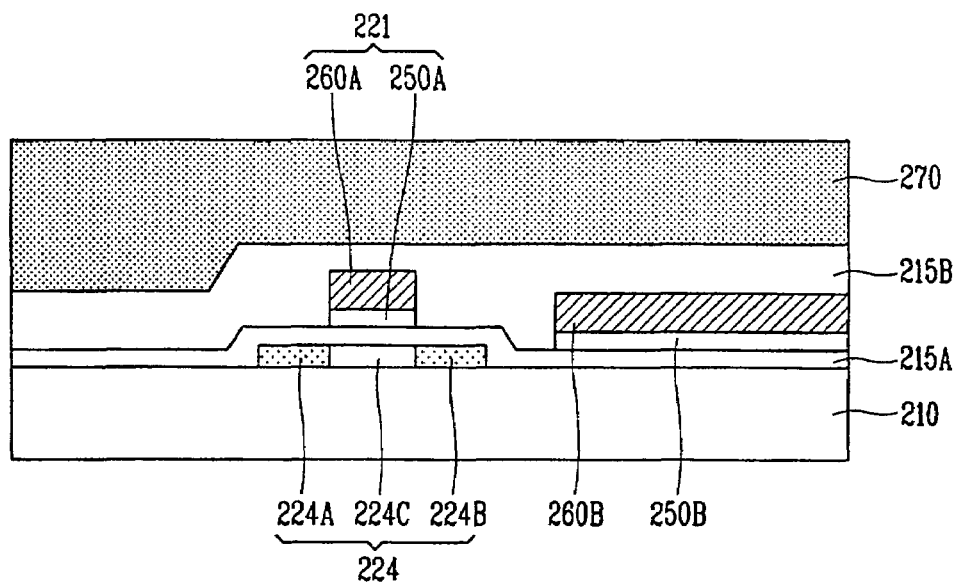
FIGS. 9A to 9D are sectional views showing a third masking process for forming a contact hole and opening a pixel electrode region in FIG. 7C in accordance with the second embodiment of the present invention.

As shown in FIG. 9A, the second insulation film 215B, namely, an interlayer insulation film, is deposited on the entire surface of the substrate 210 on which the gate electrode 221, the gate line 216 and the pixel electrode 250B have been formed.

The second insulation film 215B can be made of a transparent organic insulation material such as benzocyclobutene (BCB) or an acrylic resin for a high aperture ratio.

A photosensitive film 270 made of a photosensitive material such as photoresist is formed on the entire surface of the substrate 210, and light is selectively irradiated onto the photosensitive film 270 through the contact hole mask (not shown).

Figure 9B:
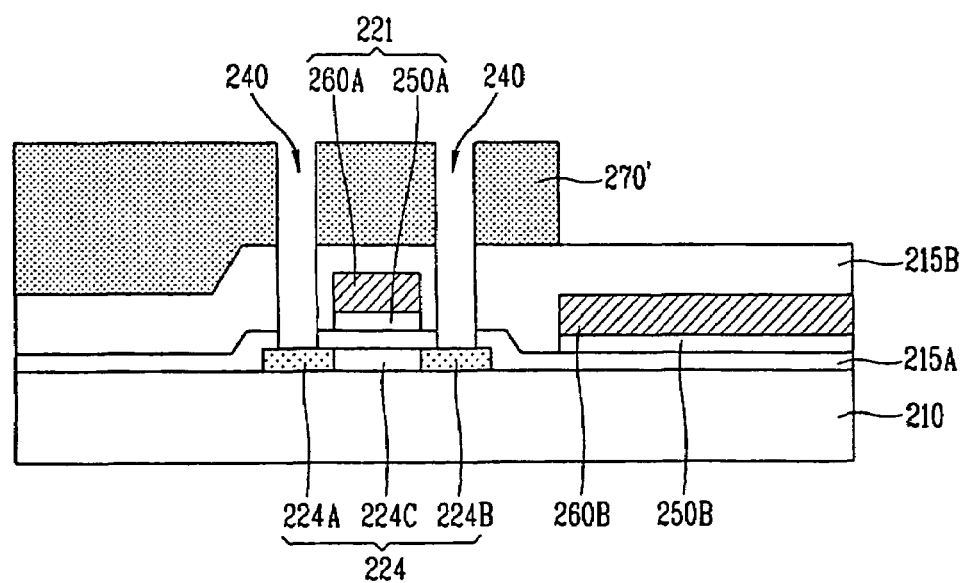

Subsequently, when the photosensitive film 270 exposed through the contact hole mask is developed, a photosensitive film pattern 270' which has been patterned according to a form of the contact hole mask remains on the second insulation film 215B as shown in FIG. 9B.

The region from which the photosensitive film pattern 270' has been removed means the region of the contact hole exposing a portion of the source/drain regions 224A and 224B of the active pattern 224 through an insulation film etching process (to be described) and the region of the pixel electrode 250B exposing the pixel electrode 250B.

As the contact hole mask opening the pixel electrode 250B region, a mask designed to have the same form as the pixel electrode 250B is applied to pattern the second insulation film 215B according to the shape of the pixel electrode 250B on the pixel electrode 250B, so that the pixel electrode pattern 260B formed as the opaque second conductive film can be completely removed through a follow-up process. As a result, such disconnection between the drain electrode and the pixel electrode according to undercut as in the first embodiment does not occur.

Figure 9C:
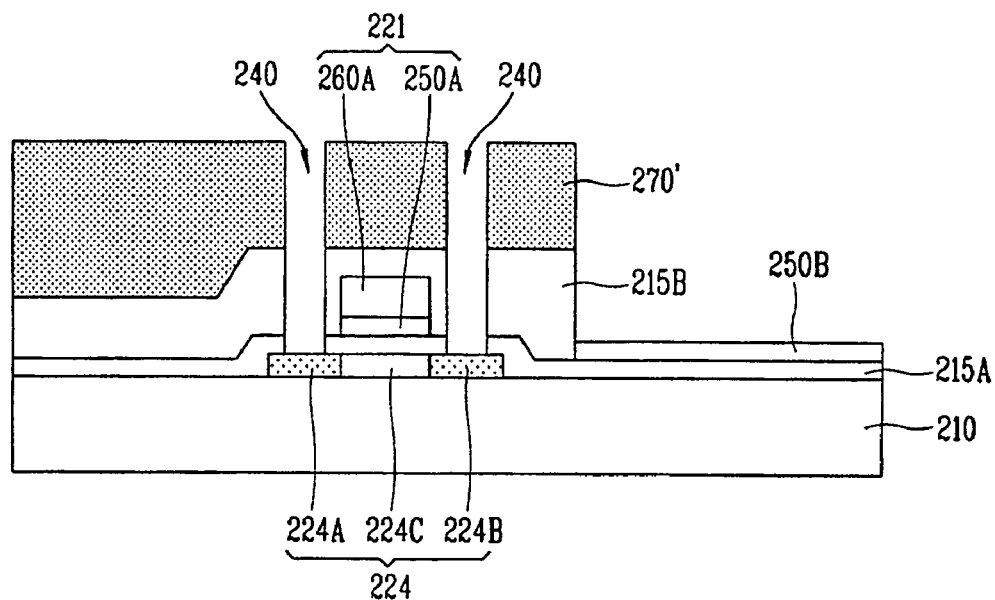

In other words, when the second insulation film 215B and the first insulation film 215A are selectively removed using the photosensitive film pattern 270' as the mask, as shown in FIG. 9C, the contact hole 240 exposing a portion of the source/drain regions 224A and 224B of the active pattern 224 is formed and, at the same time, the second insulation film 215B over the pixel electrode 250B is patterned according to the form of the pixel electrode 250B.

Subsequently, the second conductive film is etched using the photosensitive film pattern 270' to completely remove the pixel electrode pattern 260B remaining on the pixel electrode 250B.

Figure 9D:
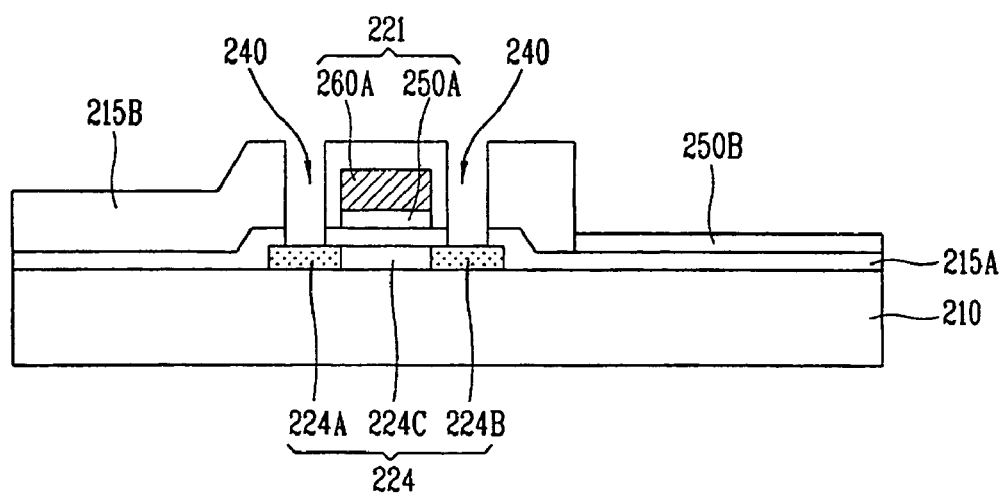

And then, as shown in FIG. 9D, the contact hole 240 exposing the source/drain regions 224A and 224B of the active pattern 224 is formed and, at the same time, the pixel electrode 250B region is completely opened to expose the surface of the pixel electrode 250B.

Figure 7D:
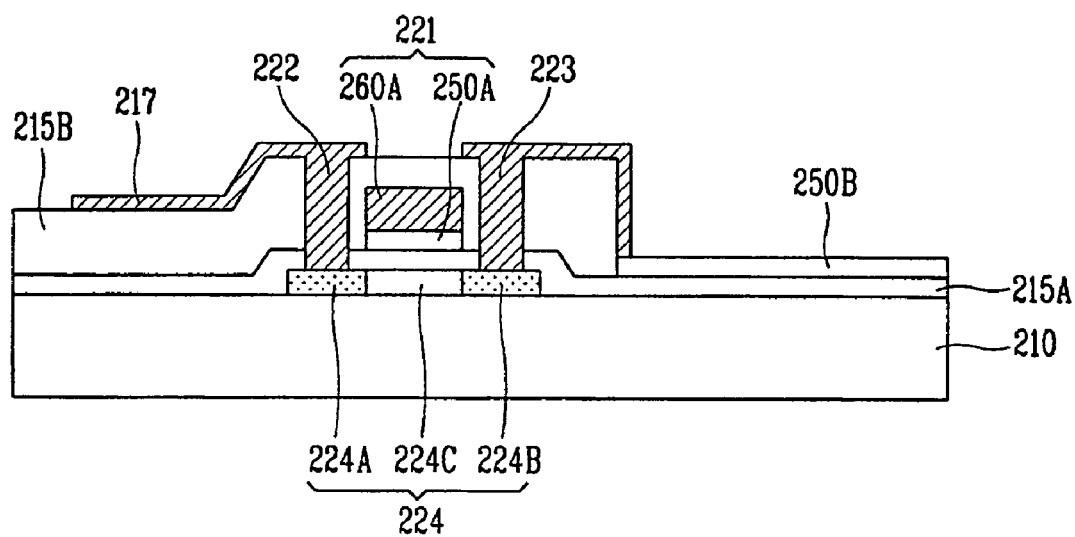
Figure 8D:
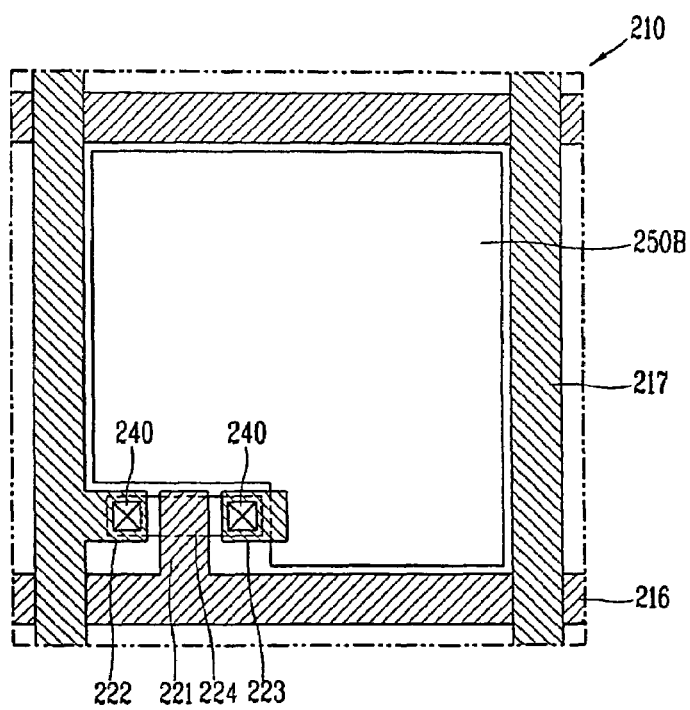

Thereafter, as shown in FIGS. 7D and 8D, a third conductive film is deposited on the entire surface of the substrate 210 and then patterned through a photolithography process (a fourth masking process) to form the source electrode 222 electrically connected with the source region 224A and the drain electrode 223 electrically connected with the drain region 224B through the contact hole 240.

At this time, the third conductive film is directly formed on the pixel electrode 250B and a portion of the drain electrode 223 formed through patterning is directly and electrically connected with the pixel electrode 250B. Thus, such disconnection between the drain electrode and the pixel electrode as in the first embodiment cannot occur.

As described above, in the above embodiment, the pixel electrode 250B region is properly opened by applying the mask designed to have the same size of the pixel electrode 250B, to prevent the second conductive film from remaining on the pixel electrode 250B. Thus disconnection between the drain electrode and the pixel electrode is prevented. In this connection, the contact hole mask for opening the pixel electrode region can be designed larger than the pixel electrode, which will now be described in detail in a third embodiment of the present invention.

FIGS. 10A to 10D are sectional views showing a third masking process for forming a contact hole and opening a pixel electrode region in FIG. 7C in accordance with a third embodiment of the present invention.

Figure 10A:
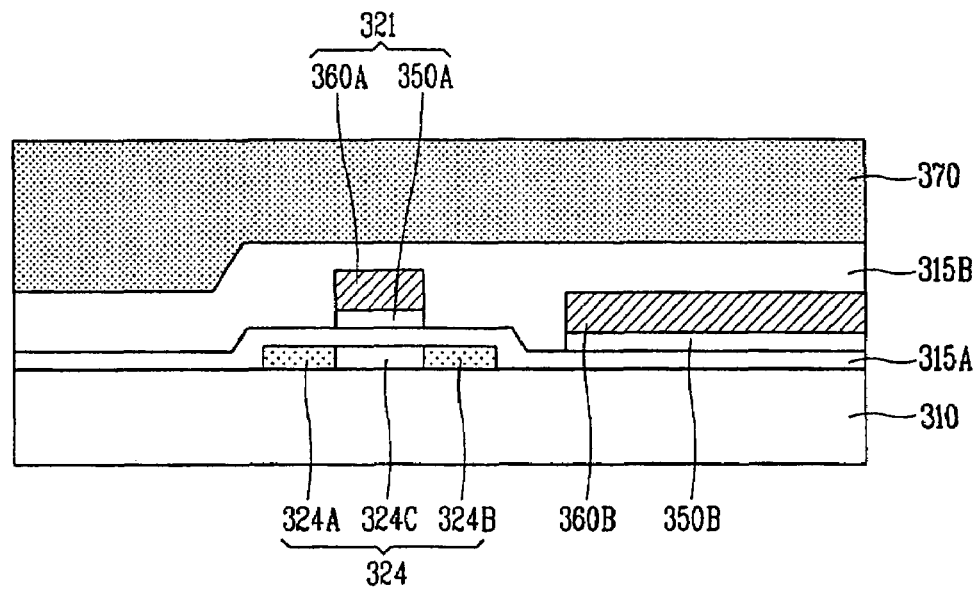
FIGS. 10A to 10D are sectional views showing a third masking process for forming a contact hole and opening a pixel electrode region in FIG. 7C in accordance with a third embodiment of the present invention.

As shown in FIG. 10A, a gate electrode 321, a gate line 316 and a pixel electrode 350B are formed on a substrate 310 through the same first and second masking processes as in the second embodiment, and then, a second insulation film 315B is formed on the entire surface of the substrate 310.

Next, a photosensitive film 370 is formed on the entire surface of the substrate 310, and light is selectively irradiated onto the photosensitive film 370 through a contact hole mask (designed to pattern the pixel electrode 350B region larger than the pixel electrode 350B).

Figure 10B:
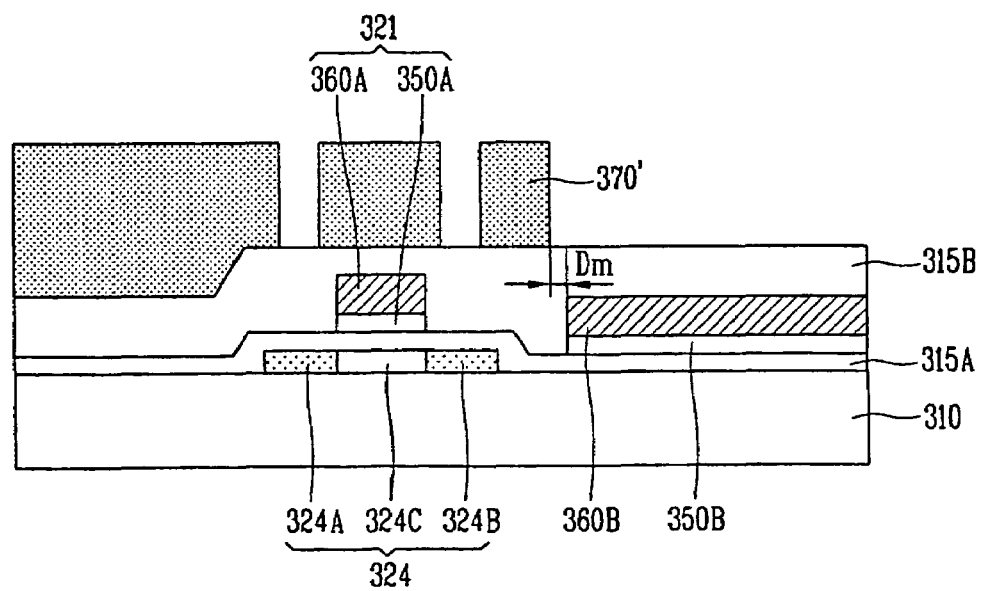

Subsequently, the exposed photosensitive film 370 is developed. Then, as shown in FIG. 10B, a photosensitive film pattern 370' which has been patterned according to a form of the mask remains on the second insulation film 315B.

At this time, the photosensitive film pattern 370' on the pixel electrode 350B is patterned larger than the pixel electrode 350B to be formed around the pixel electrode 350B with a certain interval (Dm) from the pixel electrode 350B.

The region from which the photosensitive film pattern 370' has been removed means the region of the contact hole exposing a portion of the source/drain regions 324A and 324B of the active pattern 324 through an insulation film etching process (to be described) and the region of the pixel electrode 350B exposing the pixel electrode 350B.

In this embodiment, the contact hole mask for opening the pixel electrode 350B is designed to be larger than the pixel electrode 350B in consideration of the alignment error of the mask, to pattern the second insulation film 315B according to the pixel electrode 350B on the pixel electrode 350B, so that the pixel electrode pattern 360B formed as the opaque second conductive film can be completely removed through a follow-up process. As a result, such disconnection between the drain electrode and the pixel electrode according to undercut as in the first embodiment does not occur.

Figure 10C:
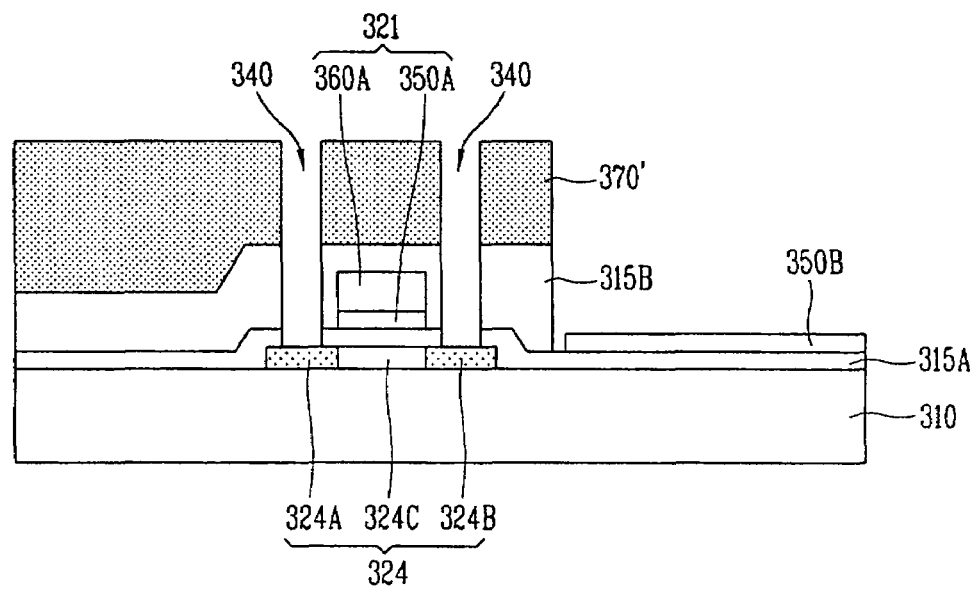

In other words, when the second insulation film 315B and the first insulation film 315A are selectively removed by using the photosensitive film pattern 370' as the mask, as shown in FIG. 10C, the contact hole 340 exposing a portion of the source and drain regions 324A and 324B of the active pattern 324 is formed and, at the same time, the second insulation film 315B of the pixel electrode 350B is patterned according to the form of the pixel electrode 350B. At this time, since the insulation films 315B and 315A had been patterned corresponding to the photosensitive film pattern 370', the second insulation film 315B and the first insulation film 315A positioned at a certain distance (Dm) from the edge of the pixel electrode 350B have been removed.

Subsequently, the second conductive film is etched using the photosensitive film pattern 370' to completely remove the pixel electrode pattern 360B remaining on the pixel electrode 350B (a third masking process) as in the second embodiment.

Figure 10D:
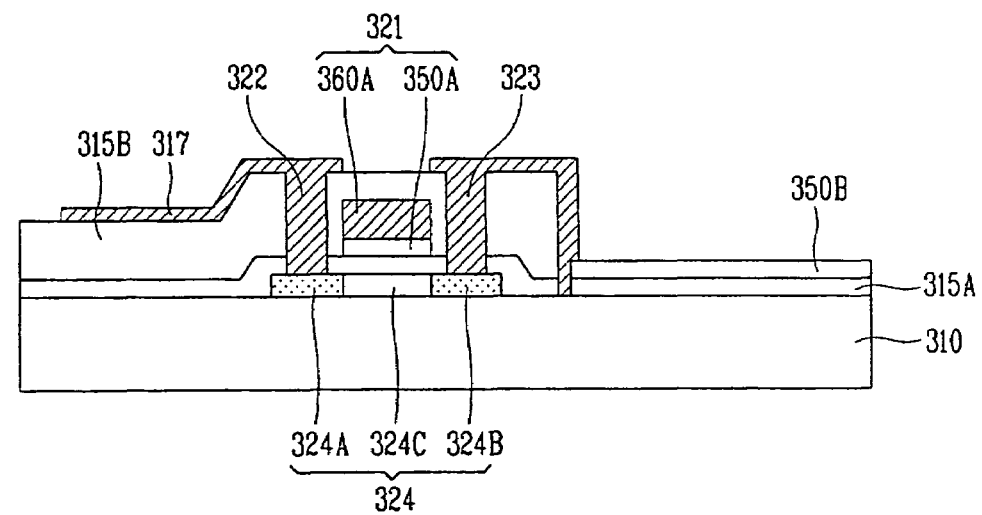

And then, as shown in FIG. 10D, a third conductive film is deposited on the entire surface of the substrate 310 and then patterned through a photolithography process (a fourth masking process) to form a source electrode 322 electrically connected with the source region 324A and a drain electrode 323 electrically connected with the drain region 324B through the contact hole 340.

As so far described, the LCD device and its fabrication method in accordance with the present invention have the following advantages.

That is, for example, by simultaneously patterning the gate electrode and the pixel electrode, the number of masks used for fabrication of the TFT can be reduced, and thus, the fabrication process and costs can be reduced.

Additionally, in the fabrication of the LCD device with the four-mask structure, a deficiency of disconnection between the drain electrode and the pixel electrode generated when the pixel electrode region is opened is resolved, so the yield is enhanced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating an LCD device, comprising:
providing a substrate;
forming an active pattern having a source region, a drain region and a channel region on the substrate;
forming a first insulation film on the substrate on the active pattern;
forming first and second conductive films on the first insulation film;
patterning the first and second conductive films to form a gate electrode, a gate line, a pixel electrode and a pixel electrode pattern such that both the gate electrode and the gate line are formed as a dual layer having the first and second conductive films, the pixel electrode is formed of the first conductive film, and the pixel electrode pattern having the second conductive film remains on the pixel electrode;
forming a second insulation film on the substrate on the gate electrode, the gate line and the pixel electrode;
forming a photosensitive film on the surface of the substrate;
applying a contact hole mask designed to pattern a pixel electrode region larger than the pixel electrode;
forming a photosensitive film pattern by irradiating and developing the photosensitive film, wherein the photosensitive film pattern on the pixel electrode is patterned larger than the pixel electrode to be formed around the pixel electrode with a certain interval (Dm) from a edge of the pixel electrode;
forming a first and a second contact hole exposing a portion of the source and drain regions of the active pattern, respectively, and opening the pixel electrode region by removing a portion of the first and second insulation films using the photosensitive film pattern as a mask,
wherein the contact hole mask for opening the pixel electrode region is designed to be larger than the pixel electrode in consideration of the alignment error of the mask and
wherein the first and second insulation films positioned at the certain distance (Dm) from the edge of the pixel electrode are removed;
removing the whole pixel electrode pattern on the pixel electrode using the photosensitive film pattern as the mask;

forming a source electrode electrically connected to the source region through the first contact hole; and forming a drain electrode electrically connected to the drain region through the second contact hole and to an upper and a side portions of the pixel electrode.

2. The method of claim 1, wherein the active pattern is formed as a silicon layer.

3. The method of claim 2, wherein the silicon layer is formed as a crystallized silicon layer.

4. The method of claim 1, wherein the first or second conductive film is a transparent conductive material including indium tin oxide (ITO) or indium zinc oxide (IZO).

5. The method of claim 1, wherein the second conductive film is an opaque conductive material including at least one of aluminum, an aluminum alloy, tungsten, copper, chromium and molybdenum.

6. The method of claim 1, wherein when the pixel electrode of the first conductive film is formed by patterning the first and second conductive films, the pixel electrode pattern having the second conductive film remains on the pixel electrode.

7. The method of claim 1, wherein a contact hole mask for forming the contact hole includes a mask pattern to open a pixel electrode region, and the second insulation film over the pixel electrode is removed using the contact hole mask.

8. The method of claim 7, wherein a pattern of the contact hole mask, is about as large as or larger than the pixel electrode is applied to the pixel electrode region to pattern the second insulation film over the pixel electrode.

9. The method of claim 1, wherein the mask pattern of the contact hole mask is applied to the pixel electrode region to pattern the second insulation film over the pixel electrode.

10. The method of claim 1, wherein the second conductive film of the upper portion of the pixel electrode is removed after the first and second insulation films are removed.

11. The method of claim 1, wherein the second conductive film on the pixel electrode is removed to expose the pixel electrode.

12. The method of claim 1, further comprising:

removing the second conductive film of the upper portion of the pixel electrode after the first and second insulation films are removed.

13. The method of claim 12, wherein the second conductive film is substantially completely removed using the second insulation film having at least a size corresponding to the form of the pixel electrode.

14. The method of claim 13, wherein the second conductive film on the pixel electrode is removed to expose the pixel electrode.

15. The method of claim 1, wherein a portion of the drain electrode extends toward the pixel electrode so as to be substantially directly connected to the pixel electrode.

16. The method of claim 1, further comprising:

implanting an impurity ion into a region of the active pattern using the gate electrode as a mask to form source and drain regions.

17. An LCD device, comprising:

an active pattern on a substrate;

a first insulation film on the substrate on the active pattern;

a gate electrode and a gate line each consisting of first and second conductive films and a pixel electrode of the first conductive film, wherein the gate electrode, the gate line and the pixel electrode are substantially simultaneously patterned and are formed on the first insulation film;

a second insulation film on the substrate on the gate electrode, the gate line and the pixel electrode, the second insulation film having a first and a second contact holes, and opening the pixel electrode at least a size corresponding to a shape of the pixel electrode, wherein the second insulation film and the first insulation film positioned at a certain distance from the edge of the pixel electrode is removed and wherein the second insulation film substantially completely expose the pixel electrode; and a source electrode connected to a source region through the first contact hole and a drain electrode connected to a drain region through the second contact hole, the source electrode and the drain electrode being formed on the substrate on the second insulation film, wherein the drain electrode connected to an upper and a side portions of the pixel electrode and a surface of the substrate.

18. The device of claim 17, wherein at least one of the first and second conductive film is a transparent conductive material including indium tin oxide (ITO) or indium zinc oxide (IZO).

19. The device of claim 17, wherein the second conductive film is an opaque conductive material including at least one of aluminum, an aluminum alloy, tungsten, copper, chromium and molybdenum.

20. The device of claim 17, wherein the pixel electrode is on a same layer of the gate electrode and the gate line.

* * * * *